(12) United States Patent
Heisler et al.

(10) Patent No.: US 6,796,171 B2
(45) Date of Patent: Sep. 28, 2004

(54) RAPID PROTOTYPE WIND TUNNEL MODEL AND METHOD OF MAKING SAME

(75) Inventors: Richard R. Heisler, Millersville, MD (US); Cliford L. Ratliff, Eldersburg, MD (US)

(73) Assignee: The Johns Hopkins University, Baltimore, MD (US)

(*) Notice: Subject to any disclaimer, the term of this patent is extended or adjusted under 35 U.S.C. 154(b) by 144 days.

(21) Appl. No.: 10/130,813

(22) PCT Filed: Oct. 26, 2001

(86) PCT No.: PCT/US01/49795
§ 371 (c)(1),
(2), (4) Date: May 20, 2002

(87) PCT Pub. No.: WO02/077599
PCT Pub. Date: Oct. 3, 2002

(65) Prior Publication Data
US 2003/0000298 A1 Jan. 2, 2003

Related U.S. Application Data

(60) Provisional application No. 60/246,030, filed on Nov. 6, 2000.

(51) Int. Cl.[7] .................................................. G01M 9/00
(52) U.S. Cl. ........................................................ 73/147
(58) Field of Search .......................................... 73/147

(56) References Cited

U.S. PATENT DOCUMENTS

| | | | |
|---|---|---|---|
| 2,899,899 A | 8/1959 | Hirsch ........................ | 102/49 |
| 3,306,101 A | 2/1967 | Holderer .................... | 73/147 |
| 3,382,712 A | 5/1968 | Curry | |
| 4,233,773 A | 11/1980 | Jones ........................ | 46/76 R |
| 4,532,801 A | 8/1985 | Coder ...................... | 73/432 R |
| 4,735,085 A | 4/1988 | Meyer ........................ | 73/147 |
| 5,020,364 A | 6/1991 | Manitt ........................ | 73/147 |
| 5,038,014 A | 8/1991 | Pratt ........................ | 219/121.6 |
| 5,205,519 A | * 4/1993 | Creel ........................ | 244/198 |
| 5,644,075 A | * 7/1997 | Hefer .......................... | 73/147 |
| 5,738,817 A | 4/1998 | Danforth .................... | 264/603 |
| 5,829,716 A | 11/1998 | Kirkwood .................... | 244/117 |

OTHER PUBLICATIONS

Evaluating Aerodynamic Characteristics of Wind–Tunnel Models Produced by Rapid Prototyping Methods, by A. Springer, Journal of Spacecraft and Rockets, vol. 35, No. 6, Nov.–Dec. 1998, 5 pages.

"A comparison of rapid prototyping techniques used for wind tunnel model fabrication" RN Chuck and VJ Thomson; Rapid Prototype Journal vol. 4, No. 4 —1998; MCB University Press; pp. 185–196.

Technology Opportunity, "Rapid Prototyping Laboratory at Marshall Space Flight Center" NASA Pub. 5–527–2(02); National Aeronautics and Space Administration, George C. Marshall Space Flight Center.

* cited by examiner

Primary Examiner—Edward Lefkowitz
Assistant Examiner—Jermaine Jenkins
(74) Attorney, Agent, or Firm—Albert J. Fasulo, II

(57) ABSTRACT

A wind tunnel model design employs a reinforcing strongback 10, made of a rigid material, for receiving a balance 12. At least one jacket section 14, made of a rapid prototype (RP) material, fits over the strongback 10 and defines at least part of an aerodynamic surface. Other aerodynamic surfaces, made of either RP materials or conventional metal materials, may be attached directly to the strongback 10.

27 Claims, 4 Drawing Sheets

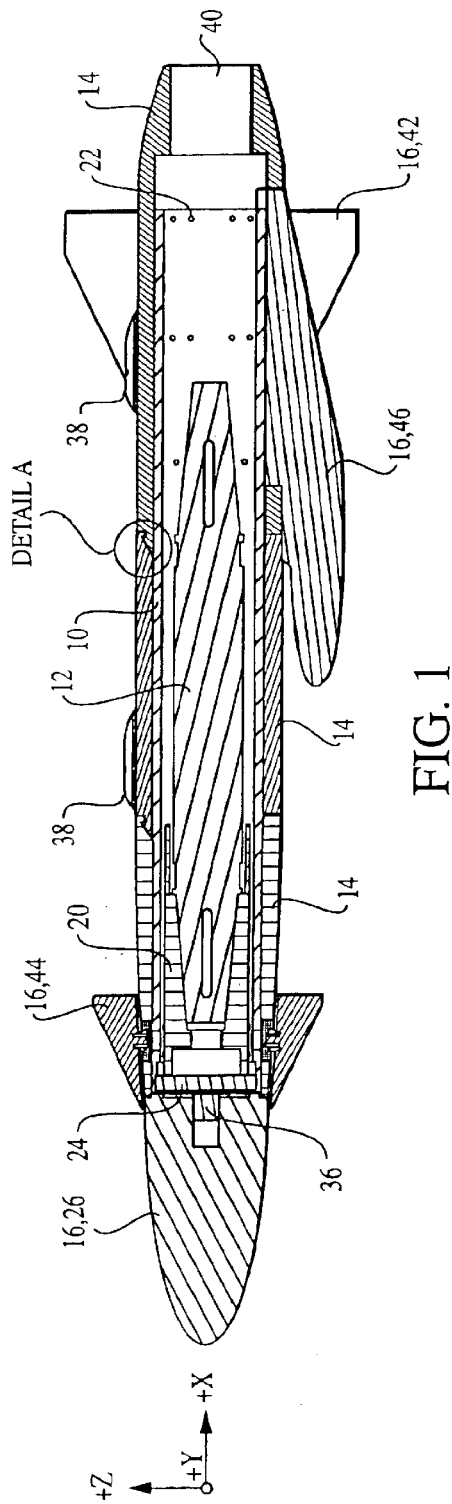
FIG. 1
DETAIL A
FIG. 2
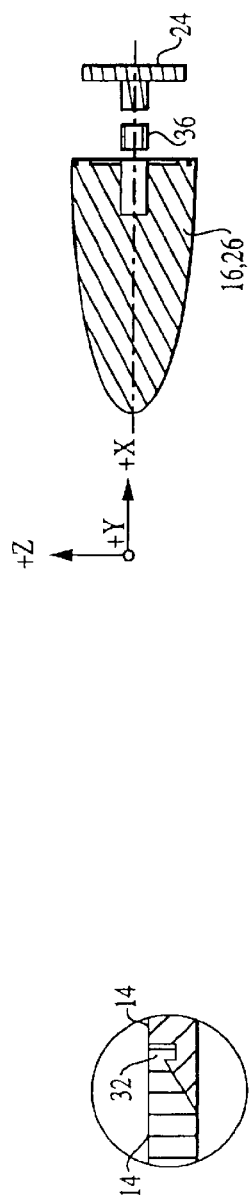
FIG. 3

RAPID PROTOTYPE WIND TUNNEL MODEL AND METHOD OF MAKING SAME

CROSS REFERENCE TO RELATED APPLICATION

This application claims priority to U.S. Provisional Application 60/246,030 filed on Nov. 6, 2000.

FIELD OF THE INVENTION

The present invention relates generally to wind tunnel models. More particularly, the present invention is directed to a wind tunnel model design using rapid prototype components and a reinforcing strongback.

BACKGROUND OF THE INVENTION

Whether an airframe is a new design, modification of an existing design, or evaluation of a competing or foreign design, an accurate, high-confidence representation of the airframe aerodynamics is paramount to any low-risk design or evaluation effort. These aerodynamic estimates are used for vehicle and component sizing, performance estimates, and autopilot design and evaluation. The only accepted method of obtaining the high fidelity aerodynamics data needed for these purposes is to build and test a scale model of the airframe in a wind tunnel.

Most wind tunnel models are fabricated of all metal components using Computerized Numerical Control (CNC) milling machines. The dimensional accuracy, surface finish and strength of such all-metal models have a distinguished history of providing high fidelity aerodynamics data for both subsonic and supersonic aircraft and rocket designs. However, the fabrication of all-metal wind tunnel models is very expensive and time consuming. Following is a brief summary of the wind tunnel model construction process and of prior art attempts at reducing the costs and time invested in such models.

A typical aircraft development program usually needs at least four to five wind tunnel models to adequately test the aerodynamics of a new airframe. The models are generally made of aluminum (for lightly stressed components) or steel (for highly stressed components) and are sculpted using 3 to 5 axis CNC milling machines. The models can require months to manufacture and are often made by small high technology companies that specialize in wind tunnel model manufacture.

Wind tunnel models are generally supported in a wind tunnel by a positioning device that is often referred to as a sting. The rear portion of a model is usually hollow to allow the sting to penetrate the model body without affecting the aerodynamic properties of the model. A force transducer called a balance is attached to the inside of the model in order to measure forces and moments acting on the model (often measuring all six degrees of freedom: drag, sideforce, lift, roll, pitch and yaw). The sting is rigidly fixed to the balance and all lead wires from the balance and any other control lines or strain gage leads from the model are routed inside or along the sting and back to the control room of the wind tunnel facility.

The cost of fabricating and instrumenting a typical wind tunnel model is on the order of $100,000; however, complex models that include engine simulators, remote controlled control surfaces, numerous rows of pressure taps, etc., can cost over $1,000,000. Companies that are able to reduce the time and costs associated with wind tunnel models therefore stand to gain a significant competitive advantage.

For several years Rapid Prototype (RP) materials and methods have been considered as a potential source of improvements to conventional wind tunnel models. RP parts can generally be made much more rapidly and less expensively than conventional machined parts. RP manufacturing is a field of high technology concerning the generation of three-dimensional solids using particles or layers of mostly polymeric materials. Two of the most popular RP techniques include stereolithography (SLA®) and fused deposition modeling (FDM®). Both techniques build solid objects layer-by-layer based on data from a computer aided design (CAD) software program. SLA® equipment is manufactured by 3D Systems, Inc. of Valencia Calif. and employs a laser beam to selectively solidify the surface layer of a photopolymer resin. The solidified surface layer forms a cross section of the prototype part. A supporting table then lowers the part several thousandths of an inch into the resin and the laser solidifies the next layer.

FDM® uses a proprietary technology developed by Stratasys, Inc., of Eden Prairie, Minn. It employs a movable nozzle to deposit a thread of molten ABS plastic. The thread solidifies instantly and forms the cross sectional layer of a part. A new thread is then deposited on top to form the next layer.

Significant use of RP components in high-load wind tunnel tests has not occurred, however, because of problems with material strength and fabrication tolerances. A study funded through the NASA Marshall Space Flight Center (MSFC) investigated the feasibility of using wind tunnel models constructed from RP materials and methods for preliminary aerodynamic assessment of future launch vehicle configurations. See A. Springer, "Evaluating Aerodynamic Characteristics of Wind-Tunnel Models Produced by Rapid Prototyping Methods," *Journal of Spacecraft and Rockets*, Vol. 35, No. 6, November–December 1998. The study concluded that "RP methods and materials can be used only for preliminary design studies and limited configurations because of the RP material properties that allow bending of model components under high loading conditions and the tolerance on the fabrication processes."

Another study was funded by Bombardier Aerospace, Inc. and conducted by McGill University to determine whether RP techniques could replace CNC machining of wind tunnel model components. See R. N. Chuk and V. J. Thomson, "A Comparison of Rapid Prototyping Techniques Used for Wind Tunnel Model Fabrication," *Rapid Prototyping Journal*, Vol. 4, No. 4, 1998, pp. 185–196. The study evaluated 22 different RP technologies and concluded that "the current plastic materials of RP models do not provide the structural integrity necessary for the survival of wind tunnel models, especially for thin section parts such as tip fins and flaps." Further, the study found that the maximum allowable dimensions using RP machines are generally significantly less than traditional CNC machines and therefore larger scale single part models cannot be built.

It is clear that increased use of RP components in wind tunnel models could dramatically reduce the cost and time associated with wind tunnel model fabrication. There is therefore a need for novel wind tunnel model design techniques that overcome some of the difficulties and deficiencies involving the use of RP components.

SUMMARY OF THE INVENTION

The present invention, among other things, presents a solution to some of the aforementioned disadvantages associated with RP wind tunnel models.

It is therefore an object of the present invention to provide a wind tunnel model design having improved strength and stiffness characteristics.

Another object of the present invention is to provide a wind tunnel model design that is less expensive and requires significantly less time to build than conventional designs associated with the prior art.

Yet another object of the present invention is to provide a wind tunnel model design that may incorporate both RP components and conventional metal components so as to optimize cost, construction timing, and strength issues.

Yet another object of the present invention is to provide a wind tunnel model design that includes a reinforcing strongback, that may in some cases be reused, for connecting directly to a balance.

These and other objects are achieved in the present invention in a wind tunnel model including a strongback, made of a rigid material and having an exterior axial surface, the strongback being designed to be supported by a balance. The strongback is at least partially inside the interior volume of a jacket section that is made of a rapid prototype (RP) material. The exterior axial surface of the strongback engages an interior axial surface of the jacket section, and the exterior surface of the jacket section defines at least part of an aerodynamic surface.

The techniques of the present invention are applicable to any wind tunnel model design intended for use with a balance for measuring forces and moments applied to the model. This includes aircraft such as planes, rockets and missiles as well as ground based vehicles such as high-speed racecars.

Other objects and advantages of the invention will become more fully apparent from the following more detailed description and the appended drawings that illustrate in detail one embodiment of the invention. In the following description, all like reference numerals refer to like elements.

BRIEF DESCRIPTION OF THE DRAWINGS

FIG. 1 is a cross-section view of a wind tunnel model of a rocket according to one embodiment of the present invention;

FIG. 2 is a detail view of jacket sections connected with an interlocking tab according to the present invention;

FIG. 3 is a cross-section view of the nose section of the embodiment shown in FIG. 1;

DETAILED DESCRIPTION OF THE INVENTION

Figure 4:
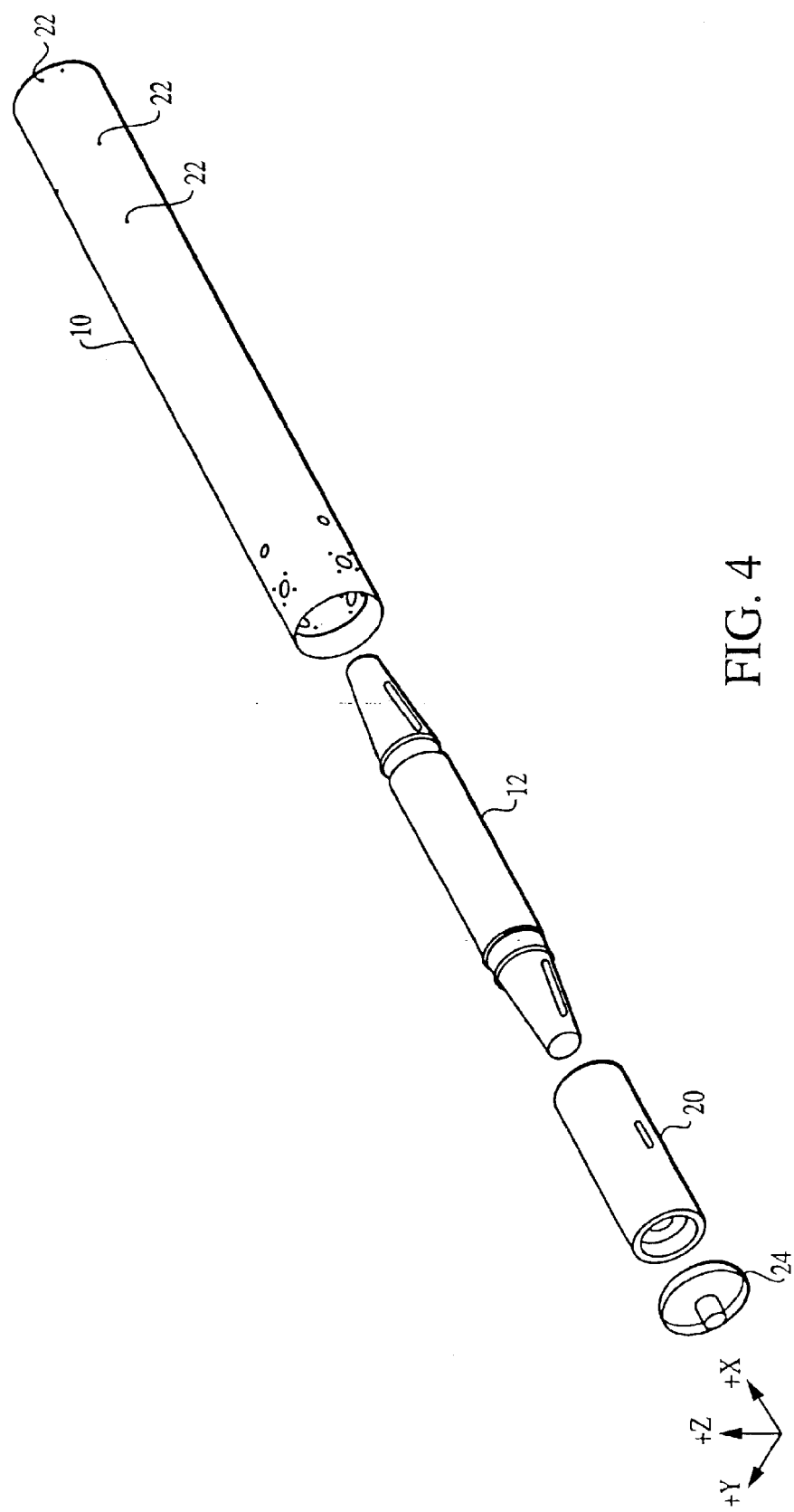
FIG. 4 is an isometric view of several internal components of the embodiment shown in FIG. 1.
Figure 5:
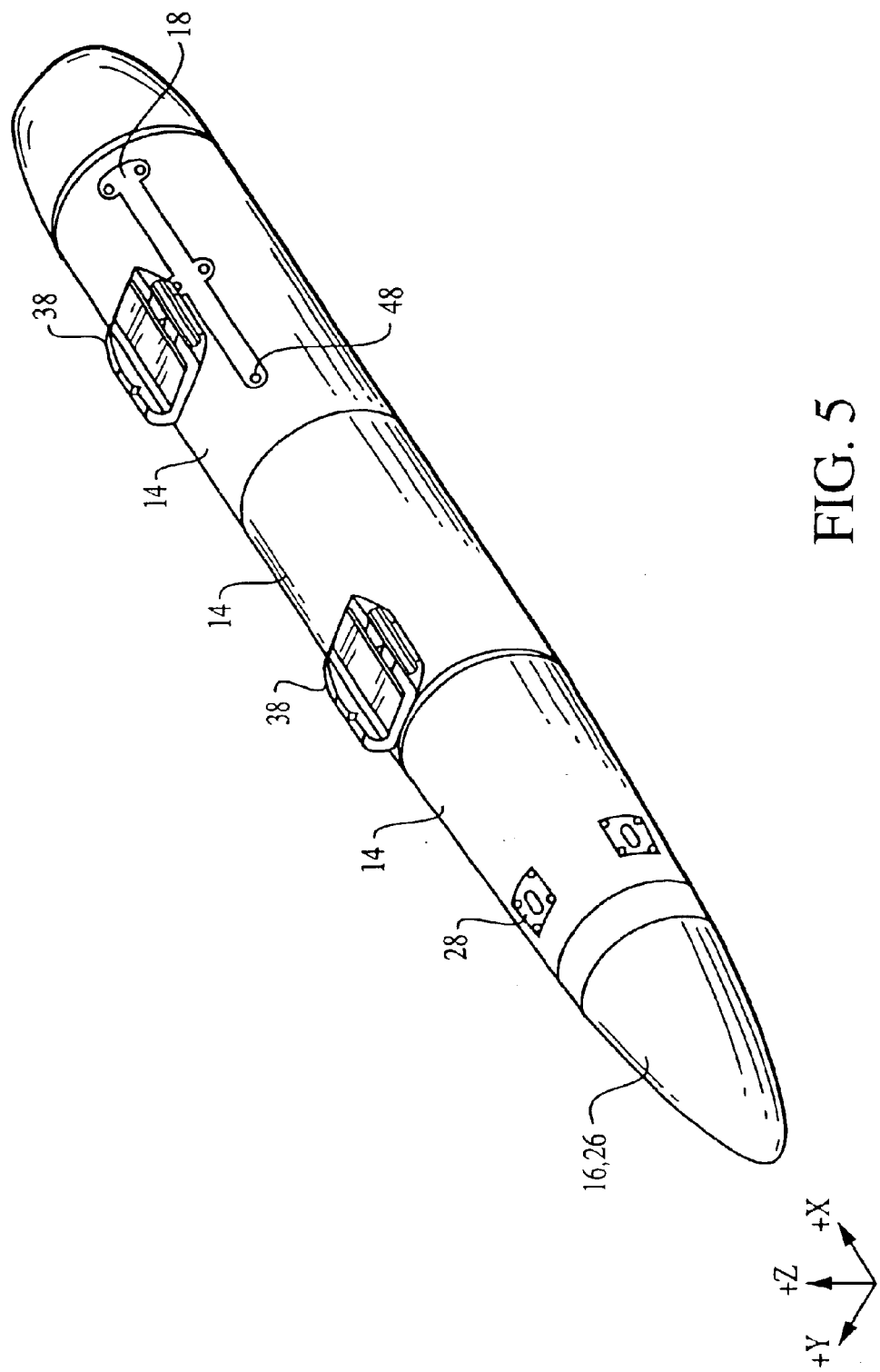
FIG. 5 is an isometric view of several of the external components of the embodiment shown in FIG. 1 with many secondary aerodynamic components removed.
Figure 6A:
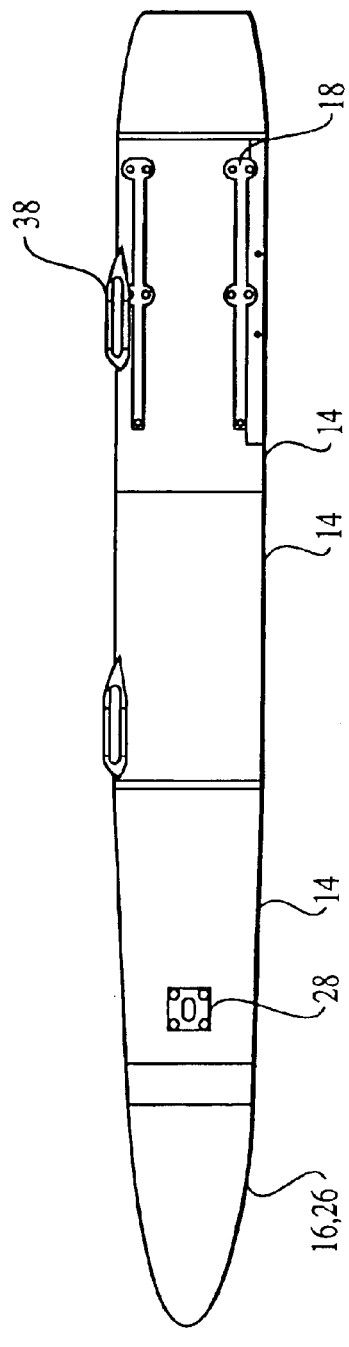
FIGS. 6A and 6B are side and bottom views, respectively, of the embodiment shown in FIG. 1 with many secondary aerodynamic components removed.
Figure 6B:
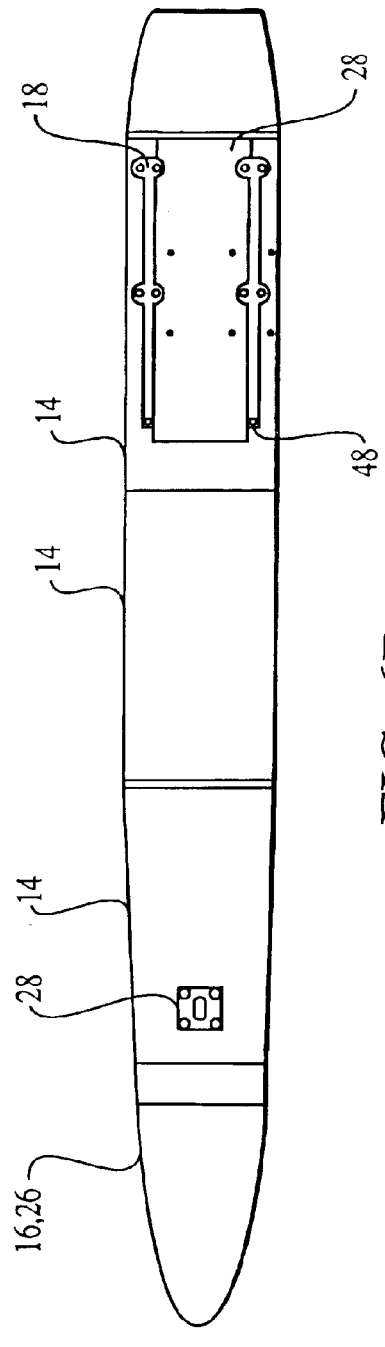

As illustrated in FIG. 1, the elements of the present invention include a strongback 10 around which the components of a wind tunnel model (WTM) are assembled. The strongback 10 may be connected to a balance 12 that measures forces applied to the WTM. Balances 12 are typically made of steel and outfitted with strain-gages or other instrumentation that measure forces and moments. At least one RP jacket section 14 is placed over the strongback 10 with a near-zero tolerance fit and defines at least part of the exterior aerodynamic surface of the WTM. Secondary aerodynamic components 16 such as a nose 26, fins 42, canards 44, inlets 46, wings, engines, etc., may be attached to the RP jacket section 14 or, for added strength, attached directly to the strongback 10. Where necessary, slots 18 (FIGS. 5, 6A and 6B) are built into the RP jacket sections 14 to allow the secondary aerodynamic components 16, e.g., the mounting pad of a canard, to be placed firmly against the exterior surface of the strongback 10.

In the embodiment of the present invention shown in FIG. 1, the balance 12 is located inside of the strongback 10. During wind tunnel testing, the balance 12 would be supported by a sting inserted through an opening 40 in the rear (downwind) end of the model. However many variations of this design are possible. For example, the balance 12 could be only partially inside the strongback 10, or the balance 12 could be attached to the rear end of a solid strongback 10.

The modular features of the present invention further allow testing of various design configurations. Various secondary aerodynamic components 16, and even various RP jacket sections 14, may be quickly substituted during testing of a single primary model design.

All RP materials used in a model according to the present invention, including RP jacket sections 14 and secondary aerodynamic components 16, may be built using any available RP technologies. These include fused deposition modeling, stereolithography, selective laser sintering, direct shell production casting, investment casting, solid ground curing, and other RP technologies.

The reinforcement of the WTM provided by the strongback 10 enables the generation of wind tunnel test data having test-to-test repeatability comparable to all-metal WTM's. The strongback 10 provides increased stiffness to the final model and is therefore generally constructed from a high-strength material. Steel or aluminum are preferred materials because they are easy to machine; however, other materials including various other metal alloys and wood are also excellent candidate materials for the strongback 10. In some embodiments of the present invention the strongback 10 may be reusable so as to further decrease cost and timing requirements for new wind tunnel model designs.

Larger scale models may also be manufactured using the techniques of the present invention because there is no need for an entire wind tunnel model to fit inside of an RP fabrication machine, such as an FDM® or SLA® machine. The RP jacket section(s) 14 and components of the WTM may be fabricated separately and then assembled or attached directly to the strongback 10.

The following non-limiting example provides a detailed description of one embodiment of a wind tunnel model design of a rocket in accordance with the present invention.

EXAMPLE

FIGS. 1–6 illustrate various views of a 15% scale rocket design according to the present invention. The rocket model was manufactured using FDM®-ABS plastic jacket sections 14 attached to a cylindrical steel strongback 10. The strongback 10 provides strength and rigidity to the plastic model and also allows larger scale models to be built. The strongback 10, fabricated from 304 stainless steel, is a 17.625-inch long cylinder with a 2.25-inch outer diameter and a 1.874-inch inner diameter. The surface of the cylinder has a surface finish of 32.

A balance adapter 20 was fabricated by the Lockheed Martin Missile and Fire Control-Dallas HSWT, which also performed the final honing of the strongback 10 inside diameter to achieve a zero tolerance fit between the balance adapter 20 and the strongback 10. The inner surface of the strongback 10 was only machined from one end to accommodate the balance adapter 20. The remainder of the strongback 10 is unfinished. Threaded screw holes 22 for attachment of canards 44, fins 42, and a faired inlet 46 were located in the strongback 10 to meet model design requirements.

The inside forward end of the strongback 10 was machined to a 2.125 inch diameter and threaded to accommodate a spindle 24 for attachment of the model nose 26. The spindle 24 is also fabricated of 304 stainless steel and has a 2.125-inch diameter threaded base for mating to the strongback 10 and a 0.5-inch diameter threaded spindle 24 for attachment of the ABS plastic nose 26.

The ABS plastic nose 26, fuselage jacket sections 14, faired inlet 46, fins 42, canards 44, launch lugs 38, and assorted filler blocks 28 were all manufactured using a Stratasys Inc. FDM-1650 machine. The machine has a 9-inch maximum limit on component length and a quoted manufacturing tolerance of ±0.005 inch. For the present 15% scale model, this tolerance scales to ±0.030 inch on the full-scale vehicle, which is comparable to a full-scale manufacturing specification. If the model had been limited to the maximum 9-inch length—as required by many prior art RP wind tunnel model designs—the same ±0.005-inch manufacturing tolerance becomes ±0.094 inch full scale, well in excess of the full-scale specification.

The RP parts were designed and solid geometry models were created using Pro-E design software and output as an .stl file. (This is an output option built into Pro-E.) The geometry information contained within the .stl file was then mathematically broken down into horizontal slices and transferred to the FDM® machine for fabrication.

The FDM-1650 operates at high temperature to melt the ABS plastic. The material is fed into a temperature-controlled extrusion head, where it is heated to a semi-liquid state. The melted plastic comes out in an extruded string of hot liquid and paints an ultra-thin layer of plastic 0.010 inch thick onto a fixtureless base. The layers are built one on the other. The material solidifies, laminating the preceding layer. Because the plastic is hot and therefore very pliable, a supporting system was built underneath to support the prototype pieces.

Because of FDM-1650 size constraints, the fuselage was built up as three jacket sections 14 plus the nose 26. The inner diameter of the jacket sections 14 was chosen to be equal to the outer diameter of the strongback 10. Because of shrinkage during fabrication, the inside of the jacket sections 14 were lightly sanded to achieve a near-zero tolerance fit over the strongback 10. The outer surfaces of the jacket sections 14 were sanded to smooth the surface and remove the burrs that accumulate as the part is grown. The outer surfaces were then sprayed with an aerosol solvent (Sandfree®) and wiped clean to produce a smooth clean surface. There are no attachments between the ABS fuselage jacket sections 14 and the strongback 10.

As shown in FIG. 2, each fuselage jacket section 14 has an interlocking tab 32 to locate and attach it to the next jacket section 14. The tabs 32 help hold the entire assembly together as well as improve the fidelity and roundness of the fuselage. Longitudinal and rotational position is maintained on the strongback 10 via attachment of fins 42, canards 44, faired inlet 46, or filler blocks 28 for these secondary aerodynamic components 16. Slots 18 and holes 48 in the individual fuselage jacket sections 14 allow the secondary aerodynamic components 16 to attach directly to the strongback 10 using the threaded screw holes 22. The slots 18 and holes 48 are incorporated into the design during the Pro-E geometry development and included in the .stl file description. As such, these geometry details are created as each jacket section 14 is grown on the FDM-1650. Screw holes to attach launch lugs 38 were drilled into the center and aft fuselage jacket sections 14 after fabrication on the FDM® machine. Helicoils 36, such as the one shown in FIGS. 1 & 3 for attaching the nose, were inserted into the drilled holes to provide a threaded surface.

The nose 26 was created in the same fashion as the fuselage jacket sections 14 with the exception that a hole was designed into a base section of the nose 26. After fabrication, the helicoil 36 was inserted into the hole to provide a threaded surface for attachment to the spindle 24.

The ABS launch lugs 38 and secondary aerodynamic components 16 were all fabricated in the same manner as the fuselage jacket sections 14. The fins 42 and canards 44 were small enough to allow them to be fabricated four at a time in the FDM® machine.

In addition to the rapid prototype ABS fins 42 and canards 44, additional fins 42, canards 44 and other secondary aerodynamic components 16 were fabricated using the following processes: (a) infusing epoxy into the ABS components; (b) casting the components out of resin using a soft mold created from a specially prepared ABS component; or (c) stamping the components out of sheet metal and sheathing them in ABS plastic.

(a) The epoxy-infused components were created on the FDM® machine and surface sanded. They were then immersed in an epoxy bath and subjected to a vacuum to remove the air contained within the rapid prototype parts and replace it with the resin epoxy. The parts were then removed from the container, excess resin was wiped from the outer surface of the part, and the resin-impregnated part was allowed to cure. This results in a FDM® rapid prototype plastic part that is less porous and has significantly greater mechanical properties than that of the original part. The final cured part was then sanded and wiped with the Sandfree® aerosol solvent to provide the relatively smooth surface used in the wind tunnel test.

(b) The cast resin components were fabricated by first growing a master fin and canard in the FDM® machine. These components were then sanded and treated with body filler to fill in surface pores and cracks. Next, a sandable primer paint was applied to coat the surface. The tail was then staged into clay to a break-away plane, using care to remove any excess clay from surfaces and edges. A release agent was sprayed on the tail and clay surfaces. A metal frame was constructed around the clay to contain the pouring of silicon resin. Once cured, the silicon mold was turned over and the other half was prepared with release agent and poured with silicon to mold the other half of the tail along the break-away plane. The removal of the rapid prototype tail left an internal cavity in the tail. With the use of some vent holes, a hypodermic needle was used to pressure fill the cavity with an epoxy resin. If high-pressure injection plastic casting is required, a hard tool mold can be made from the staged clay process by substituting a metal epoxy surface coat for the silicon. Thermalset plastics such as polycarbonates can also be used to make parts having higher strength and durability if required.

(c) The last process listed above for fabricating the secondary aerodynamic components used sheet metal as a reinforcing core. Hollow ABS plastic sheaths were fabricated in the FDM machine. The sheaths formed the aerodynamic surfaces and fit tightly over the sheet metal cores.

After all components were fabricated, the assembly of the model on the strongback 10 proceeded as follows: the forward fuselage jacket section 14 was slid onto the strongback 10 from the aft end of the strongback 10 until only an interlocking tab 32 remained; the center fuselage jacket section 14 was mated to the forward section via an interlocking tab 32 and the combined sections slid forward until only the center fuselage jacket section tab 32 remained off the strongback 10; the aft fuselage/boattail jacket section 14 was attached via an interlocking tab 32 and the three combined sections translated forward to align the necessary holes 22 in the strongback 10 to the matching slots 18 and holes 48 in the jacket sections 14; finally, the nose 26 of the model was attached to the strongback 10 by screwing the metal spindle 24 into the forward end of the strongback 10 and then screwing the threaded ABS nose 26 onto the spindle 24.

At this point the entire fuselage was completely assembled and the remaining components were added as needed. For the present model, several configuration options were available, with all the optional components attached using screws and common screw holes.

If the body-alone configuration were to be tested, the filler blocks 28 would be installed in lieu of the canards 44, inlet 46, and fins 42, etc. This creates a clean symmetric cone-cylinder configuration so that the model's symmetry characteristics may be quantified as a function of roll angle. If the "full-up" configuration was desired, the canards 44 are installed using four screws per canard. These screws pass through the canard mounting pad and screw directly into the strongback 10. The fins 42 and inlet 46 attach in the same way. Because the launch lugs 38 are not subjected to large aerodynamic forces, it was satisfactory to screw them into the ABS fuselage jacket sections 14 using helicoil attachments 36.

In summary, as demonstrated in the above detailed example, the present invention provides for a rapid prototype wind tunnel model having improved strength and stiffness characteristics. Other advantages of the present invention include wind tunnel model designs that are less expensive and require significantly less time to build than conventional designs associated with the prior art. Also, designs according to the present invention may incorporate both RP components and conventional metal components, e.g., RP fuselage jacket sections 14 and metal canards 44, so as to optimize cost, construction timing, and strength issues. Finally, the reinforcing strongback 10 of the present invention may be reusable to further decrease costs and timing associated with a new wind tunnel model design.

While the above description contains many specifics, the reader should not construe these as limitations on the scope of the invention, but merely as examples of specific embodiments thereof. Those skilled in the art will envision many other possible variations that are within its scope. Accordingly, the reader is requested to determine the scope of the invention by the appended claims and their legal equivalents, and not by the specific embodiments given above.

What is claimed is:

1. A wind tunnel model comprising:
    a strongback, comprising a rigid material and having an exterior axial surface, said strongback designed to be supported by a balance; and
    at least one jacket section, made of a rapid prototype (RP) material, having an interior axial surface and an exterior surface, said interior axial surface of said jacket section defining an interior volume, said strongback being at least partially inside said interior volume of said jacket section such that said exterior axial surface of said strongback engages said interior axial surface of said jacket section, said exterior surface of said jacket section defining at least part of an aerodynamic surface.

2. The wind tunnel model of claim 1, further comprising a balance, said balance rigidly connected to said strongback and said strongback rigidly connected to said jacket section, whereby, when said balance is supported by a wind tunnel facility sting, all aerodynamic forces and moments acting on said jacket section are transferred first to said strongback and then to said balance.

3. The wind tunnel model of claim 1 wherein said strongback is made of a material selected from the group consisting of steel, aluminum, metal alloys and wood.

4. The wind tunnel model of claim 1 wherein said jacket section is made of an RP material selected from the group consisting of photopolymers, thermoplastics, cast ceramic powders, and sintered powdered metals.

5. The wind tunnel model of claim 1 wherein said jacket section is made of ABS plastic infused with resin.

6. The wind tunnel model of claim 1 further comprising:
    a secondary aerodynamic component connected to said jacket section.

7. The wind tunnel model of claim 1 further comprising:
    a secondary aerodynamic component connected directly to said strongback.

8. The wind tunnel model of claim 6 or claim 7 wherein said secondary aerodynamic component is a wing, fin, canard, nose, engine or inlet.

9. The wind tunnel model of claim 6 or claim 7 wherein said secondary aerodynamic component is made of a material selected from the group consisting of steel, aluminum, titanium, metal alloys, wood, photopolymers, thermoplastics, cast ceramic powders, sintered powdered metals, and combinations thereof.

10. The wind tunnel model of claim 7 wherein said jacket section defines a slot between said external and internal surfaces of said jacket section for receiving said secondary aerodynamic component.

11. The wind tunnel model of claim 1, further comprising a plurality of said jacket sections.

12. The wind tunnel model of claim 11, wherein said jacket sections have interlocking tabs for connecting said jacket sections together.

13. The wind tunnel model of claim 1 wherein said strongback is reusable.

14. The wind tunnel model of claim 1, wherein said strongback has an interior axial surface defining an interior volume for receiving a balance.

15. A wind tunnel model comprising:
    strongback means for providing a rigid, longitudinal support;
    jacket section means, made of a rapid prototype (RP) material, for defining an aerodynamic surface, said jacket section means fitting at least partially over said strongback means.

16. The wind tunnel model of claim 15 wherein said jacket section means and strongback means are rigidly connected to a balance, whereby, when said balance is supported by a wind tunnel facility sting, all aerodynamic forces and moments acting on said jacket section means are transferred first to said strongback means and then to said balance.

17. The wind tunnel model of claim 15 wherein said strongback means is made of a material selected from the group consisting of steel, aluminum, metal alloys and wood.

18. The wind tunnel model of claim 15 wherein said jacket section means is made of an RP material selected from the group consisting of photopolymers, thermoplastics, cast ceramic powders, and sintered powdered metals.

19. The wind tunnel model of claim 15 wherein said jacket section means is made of ABS plastic infused with resin.

20. The wind tunnel model of claim 15 further comprising:
a secondary aerodynamic component connected to said jacket section means.

21. The wind tunnel model of claim 15 further comprising:
a secondary aerodynamic component connected directly to said strongback means.

22. The wind tunnel model of claim 20 or claim 21 wherein said secondary aerodynamic component is a wing, fin, canard, nose, engine or inlet.

23. The wind tunnel model of claim 20 or claim 21 wherein said secondary aerodynamic component is made of a material selected from the group consisting of steel, aluminum, titanium, metal alloys, wood, photopolymers, thermoplastics, cast ceramic powders, sintered powdered metals, and combinations thereof.

24. The wind tunnel model of claim 21 wherein said jacket section means defines a slot for receiving said secondary aerodynamic component.

25. The wind tunnel model of claim 15 further comprising a plurality of said jacket section means.

26. The wind tunnel model of claim 25, wherein said jacket section means have interlocking tabs for connecting said jacket section means together.

27. The wind tunnel model of claim 15 wherein said strongback is reusable.

* * * * *